United States Patent [19]

Reinecke

[11] Patent Number: 4,887,067
[45] Date of Patent: Dec. 12, 1989

[54] WARNING DEVICE FOR PNEUMATIC VEHICLE TIRE

[75] Inventor: Erich Reinecke, Burgdorf, Fed. Rep. of Germany

[73] Assignee: WABCO Westinghouse Fahrzeugbremsen GmbH, Hannover, Fed. Rep. of Germany

[21] Appl. No.: 232,742

[22] Filed: Aug. 16, 1988

[30] Foreign Application Priority Data

Aug. 21, 1987 [DE] Fed. Rep. of Germany ....... 3727875

[51] Int. Cl.$^4$ ............................................. B60C 23/00
[52] U.S. Cl. ..................... 340/442; 340/445; 73/146.5; 116/34 R; 200/61.22
[58] Field of Search ............ 340/58, 442–448; 73/146–146.8; 116/34 R, 34 A, 34 B; 200/61.22–61.26

[56] References Cited

U.S. PATENT DOCUMENTS

| | | | |
|---|---|---|---|
| 3,680,523 | 8/1972 | Gaskins | 340/58 |
| 4,235,184 | 11/1980 | Schiavone | 340/58 |
| 4,238,955 | 12/1980 | Reinecke | 73/146.5 |
| 4,476,455 | 10/1984 | Kawakami | 340/58 |
| 4,531,112 | 7/1985 | Thomas | 340/58 |
| 4,768,375 | 9/1988 | Eckardt et al. | 340/58 |

FOREIGN PATENT DOCUMENTS 2813058 4/1984 Fed. Rep. of Germany.

Primary Examiner—Donnie L. Crosland
Attorney, Agent, or Firm—J. O. Ray, Jr.

[57] ABSTRACT

A warning device for a pneumatic vehicle tire. The device includes a measurement unit which is mounted at the rim or at the wheel and which is connected with the inner space of the tire. A contact element penetrates the rim and points towards the inner surface of the tire which is opposite to the running surface, and which can be activated towards the inside of the wheel by allowing the inner surface to run against the rim surface. By activating the contact element, a nearly pressureless condition of the tire will be recorded.

17 Claims, 2 Drawing Sheets

WARNING DEVICE FOR PNEUMATIC VEHICLE TIRE

FIELD OF THE INVENTION

The present invention relates, in general, to equipment for recording a pressure loss in a tire mounted on a rim of a vehicle and, more particularly, this invention relates to an appaaratus for both measuring and recording not only a drop in the tire pressure but, also, the pressureless condition of such tire during operation of such vehicle.

BACKGROUND OF THE INVENTION

Prior to the present invention, a device has been taught in the prior art that is capable of recording a loss in pressure of a vehicle tire. See, for example, German publication De-PS 28 13 058. This prior art device is activated by the tire pressure, and signals the drop of a predetermined air pressure which is below a predetermined limit within the tire. This device has a range of measurement that is set by an upper and a lower pressure limit.

The problem with this device, however, is that it is unable to indicate a problem below a predetermined measurement range. In other words, this device is incapable of indicating a condition of a tire in which substantially all of the pressure has been lost, i. e., pressureless. This problem is especially serious in those cases where vehicle wheels with tire and rim emergency operating capabilities have a means by which they can operate for a relatively long distance, even with a completely flattened tire.

In those vehicles equipped with the above-described tire and rim systems, the rim surface is generally shaped in such a configuration that the flattened running surface of the tire, which is the tire surface in contact with the upper surface of the road, continues to act as the supporting surface for the tire. In the majority of the non-critical traffic situations to be encountered by an operator of the vehicle, such conditionally capable tire operation cannot be ascertained with any degree of certainty by the operator with the use of the prior aart devices presently known.

SUMMARY OF THE INVENTION

The present invention provides a warning device to alert an operator of a vehicle about a condition of a pneumatic vehicle tire. This warning device includes a pressure measurement device which is positioned adjacent one of the rims holding the tire or at the wheel flange of a vehicle wheel. At least a portion of such pressure measurement device is connected with the inside of the tire. The pressure measurement device transmits a signal when a predetermined non-approved tire pressure for a given operating condition occurs. An adjustment mechanism is provided. The adjustment mechanism rotates with the vehicle wheel and includes an adjusting plunger which can be rest by the signal emitted by the measurement device. A sensor is provided and is mounted rigidly on the vehicle at a predetermined location with respect to the adjustment mechanism. The sensor provides a contactless sensing function to determine the position of the plunger for the measurement device. At least one of a control and an indicating device is provided. Such control and/or indicating device is connected to receive a signal from the sensor, and can be activated by such signal from the sensor. The measurement device consists of a contact element, the end of which reaches into the inner space of the tire. The contact element penetrates one of the rim surface of the rim and the rim in the vicinity of the rim surface. The sensing element is mounted in such a manner that the contact element of the measuring device is one of adjustable and operable by approaching the inner surface of the tire against the rim surface. The signal to be emitted by the measurement device can be generated by one of adjustment and operation of the sensing plunger.

OBJECTS OF THE INVENTION

It is, therefore, one of the primary objects of the present invention to provide an improved warning device for a pressure loss in a pneumatic vehicle tire in which not only a drop in the tire pressure but also the pressureless condition of the tire during operation of the vehicle can be measured and recorded.

Another object of the present invention is to provide an improved warning device for a pressure loss in a pneumatic vehicle tire which can be fitted to specific ire pressures of varying types of specific operating conditions without modifications.

Still another object of the present invention is to provide an improved warning device for a pressure loss in a pneumatic vehicle tire in which a flattening of the running surface of the tire, due to overloading at an unsuitable tire pressure, can be recognized by such warning device.

A further object of the present invention is to provide an improved warning device for a pressure loss in a pneumatic vehicle tire that is simple in design, thereby minimizing causes for problems during operation of such warning device.

In addition to the above-described objects and advantages of the warning device for pressure loss in pneumatic vehicle tires, various other objects and advantages of the present invention will become more readily apparent to those persons skilled in the art from the following more detailed description of the invention, when such description is taken in conjunction with the attached drawings and the appended claims.

BRIEF DESCRIPTION OF THE INVENTION

Figure 1:
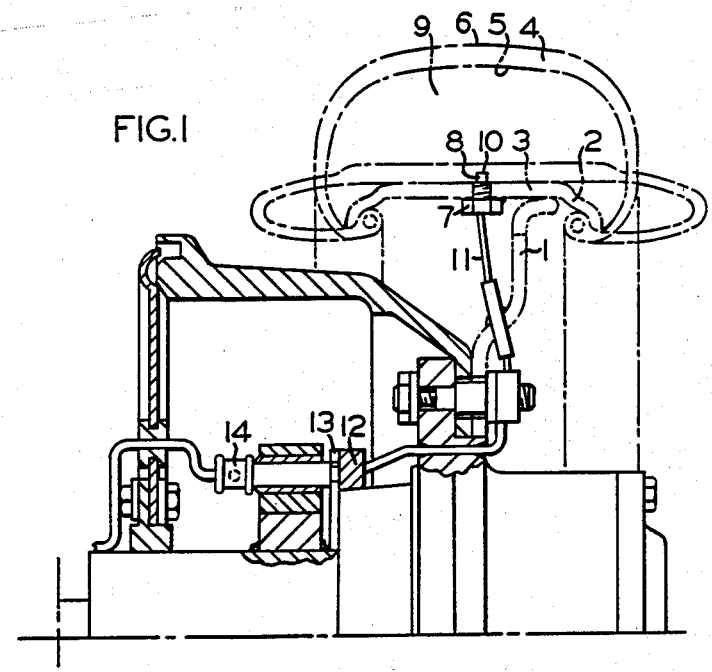
FIG. 1 is a fragmented view, partially in cross-section, which illustrates a vehicle tire equipped with a presently preferred embodiment of a tire pressure warning device.

Now, refer more particularly to FIG. 1. Illustrated therein is a vehicle wheel assembly consisting of a wheel 1 and a rim 2. The rim surface 3 of the rim 2 acts as a generally circular support surface for the tire 4 in the event of a flat tire condition. In the case with a pressureless or a nearly pressureless tire, the inner surface 5 of the tire 4 is supported against the running surface 6 of the tire 4 on one hand, and against the rim surface 3 on the other. The tire and rim system illustrated includes an emergency running capability. The emergency runningn capability enables the supported part of the tire 4 against the rim 3 to continue to act as "hard rubber tire" and continues to operate.

A measurement device 7 has been positioned at the rim 2. Such measurement device 7 could be also positioned at the wheel 1. In any event, the measurement device 7 projects through the rim 2 in the vicinity of the rim surface 3 into the inner space 9 of the tire. The measurement device 7 includes a sensing element 8. Such sensing element 8 is shapedd like a plunger. The end 10 of the plunger-shaped sensing element 8, which projects into the inner space 9, is directed against the inner surface of the tire 4. The plunger-shaped sensing element 8, when touched by the inner surface 5 of the tire 4 which advances or comes to lie against the rim 3, starting from an initial position and proceeding radially against the rim surface 3, can be adjusted to a resetting force in the direction of the wheel.

By adjusting the plunger-shaped sensing element 8, an adjustment path is created as an initial signal for the measurement device 7 which corresponds to the adjustment of the plunger-shaped sensing element 8. The adjustment is transmitted through the plunger-shaped sensing element 8 and the transfer mechanism 11 onto a setup device 12 at the circumference of the wheel. The setup device 12 includes adjustment member 13. The adjustment member 13 is adjusted by way of the initial signal of the measurement device 7 and a transfer mechanism 11.

It is possible that the measurement device 7 can be equipped with a transfer device with which the measurement path can be extended to extend the range of the measurement proper.

The position of the adjustment member 13 is recorded by an axle-mounted sensor 14. The axle-mounted sensor 14 records the data without touching the tire components and transmits them to an evaluation and recording unit.

The setup device 12 and the measurement device 7 are positioned with respect to each other in such a way that the adjustment member 13 runs through the sensing range of the axle-mounted sensor 14. This occurs when the plunger-shaped sensing element 8 is activated by flattening of the tire 4.

Figure 2:
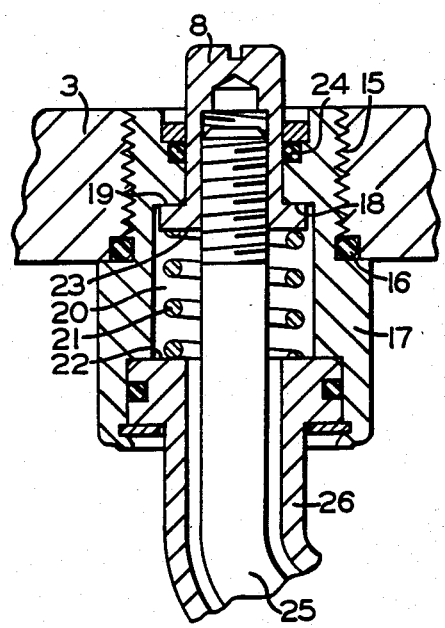
FIG. 2 is a fragmented cross-sectional view of a presently preferred measuring device used in the warning device illustrated in FIG. 1; and FIG.. 3 is a fragmented side elevation view of the measuring device illustrated in FIG. 2, which is equipped with an auxiliary operating device.

Now, refer more particularly to FIG. 2. Illustrated therein is one presently preferred example of the measurement device 7. In this measurement device 7, the housing 17 is connected with the rim surface 3 by means of a screw connection 15 and a seal 16. The position of the plunger-shaped sensing element 8 in relation to the rim surface 3 is determined by a stop 18 in the housing 17 and a support surface 19 of the plunger-shaped sensing element 8. The stop 18 can also be adjustable to allow for an adjustment of the position of the plunger-shaped sensing element 8 in relation to the rim surface 3. By extending the depth of the plunger-shaped sensing element 8 into the inner space 9, the measurement could commence before any drastic flattening of the tire 4.

A spring 21 has been positioned into a chamber 20 of the housing 17. The spring 21 is supported on one end on a solid surface 22 of the housing 17, and on the other end on the surface 23 of the plunger-shaped sensing element 8. The plunger 8 is thereby prestressed against the stop 18 in its rest position. The chamber 20 is sealed against the inner space 9 of the tire 4 by means of a seal 24.

The transfer mechanism 11 is formed by an articulated rod system 25 having a cover 26 and is connected to the plunger-shaped sensing element 8. The transfer mechanism 11 can be mounted by traditional means to the wheel 1, such as clamps. It is also possible to equip the wheel 1 with a hollow space, or depression, in which the transfer mechanism 11 can be mounted completely or partially. This hollow space, or depression, could counteract any unbalance which may have been caused by the measurement device 7.

Figure 3:
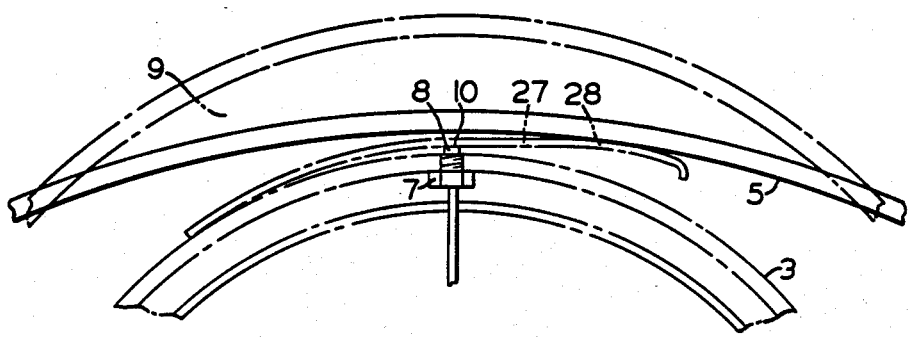

Now, refer more particularly to FIG. 3. FIG. 3 shows the measurement device 7 with an auxiliary device 27 in the form of a leaf spring 27. The leaf spring 27 is mounted on one side rigidly with the rim surface 3. The free part of the leaf spring 27 is placed between the plunger-shaped sensing element 8 and the inside surface 5, of the tire 4, in such a way that with a force acting on the free end 28, by way of the inner surface 5, the plunger-shaped sensing element 8 can be activated. By an appropriate setting of the plunger-shaped sensing elemen 8, as well as a suitable shape of the leaf spring 27, the measurement range can be varied.

With an extended measurement range, either by means of the leaf spring 27, or by means of the above-described extension of the depth of penetration of the plunger-shaped sensing element 8 into the inner surface 9 of the tire 4, the start or the existance of an emergency condition can be indicated, even though the tire 4 is supported on the rim surface 3 and continues to function as "full rubber tire".

The measurement device 7 can be shaped as a compression chamber, which is activated when the inner surface 5 of the tire 4 comes in contact with the rim surface 3, whereby a modification of the chamber pressure activates a signal on the transfer mechanism 11.

The measurement device 7 can also act as a sensor, for example, in the form of a penetration coil, or as a proximity switch which is activated when the inner surface 5 of the tire 4 rests against the rim 3 and produces a contact, whereby an electrical signal can be used for activating the adjustment mechanism.

Although a presently preferred embodiment of a warning device for penumatic vehicle tires has been described in detail above, it should be obvious that various other modifications and adaptations of the present invention can be made by persons skilled in the art without departing from the spirit and scope of the appended claims.

I claim:

1. A warning device for use in combination with a pneumatic tire mounted on a vehicle wheel having tire and rim emergency operating capabilities, said warning device indicates a predetermined pressure condition existing in said pneumatic tire mounted on said vehicle, said combination of said warning device and said pneumatic tire comprising:

(a) a pneumatic tire having tire and rim emergency operating capabilities mounted on said vehicle;

(b) a measurement device mounted on one of said rim and a wheel flange of said vehicle wheel in a position to have at least a portion thereof extending into an inner space of said tire mounted on said rim, said measurement device producing a signal when a predetermined unapproved tire pressure for a given operating condition occurs, said measurement device includes a contact element one end of which extends into said inner space of said tire through one of a rim surface of said rim and said rim adjacent said rim surface, said contact element being mounted such that it is at least one of adjustable and operable by contact with an inner surface of said tire against said rim surface, said signal produced by said measurement device being produced by at least one of an adjustment an operation of said contact element;
(c) an adjustment mechanism positioned to rotate with said vehicle. wheel, said adjustment mechanism includes an adjustment plunger which can be reset by a signal supplied to said adjustment mechanism from said measurement device;
(d) a contactless sensor rigidly-mounted on said vehicle in a predetermined relationship with respect to said adjustment mechanism to determine a relative position of said contact element of said measurement device; and
(e) at least one of a control device and an indicating device connected to be activated by a signal from said contactless sensor.

2. A combination of a warning device and a pneumatic tire, according to claim 1, wherein said warning device further includes a transfer mechanism and said signal produced by said measuremen device correlates an adjustment path which is generated by adjusting said contact element by way of said transfer mechanism.

3. A combinaion of a warning device and a pneumatic tire, according to claim 2, wherein said warning device further includes a setup mechanism having an adjustment member and said signal produced by said measurement device is transmitted by said transfer mechanism to said adjustment member of said setup mechanism.

4. A combination of a warning device and a pneumatic tire, according to claim 2, wherein said contact element includes a movable plunger positioned in said measurement device.

5. A combination of a warning device and a pneumatic tire, according to claim 3, wherein said contact element includes a movable plunger positioned in said measurement device.

6. A combination of a warning device and a pneumatic tire, according to claim 4, wherein said transfer mechanism includes adjustable rods which are connected with said plunger.

7. A combination of a warning device and a pneumatic tire, according to claim 2, wherein said transfer mechanism is positioned at least partially in a hollow space and groove located in a wheel proper.

8. A combination of a warning device and a pneumatic tire, according to claim 3, wherein said transfer mechanism is positioned at least partially in a hollow space and groove located in a wheel proper.

9. A combination of a warning device and a pneumatic tire, according to claim 6, wherein said transfer mechanism is positioned at least partially in a hollow space and groove located in a wheel proper.

10. A combination of a warning device and a pneumatic tire, according to claim 1, wherein said warning device further includes an auxiliary activating device placed in an inside portion of said tire and located between said inner surface of said tire and an end of said contact element, said auxiliary activating device is adjustable by shortening a distance between said inner surface and said rim surface.

11. A combination of a warning device and a pneumatic tire, according to claim 10, wherein said auxiliary activating device comprises a leaf spring which is mounted on one side of said rim surface, said leaf spring having a free end which is supported between said end of said contact element and said inner surface of such tire.

12. A combination of a warning device and a pneumatic tire, according to claim 4, wherein an initial position of said plunger in relationship to said rim surface is determined by a rigidly-mounted stop located at said rim surface and an opposite supporting surface for said plunger which faces said stop.

13. A combination of a warning device and a pneumatic tire, according to claim 6, wherein an initial position of said plunger in relationship to said rim surfce is determined by a rigidly-mounted stop located at said rim surface and an opposite supporting surface for said plunger which faces said stop.

14. A combination of a warning device and a pneumatic tire, according to claim 12, wherein said stop is radially adjustable in relationship to said rim surface.

15. A combination of a warning device and a pneumatic tire, according to claim 1, wherein said end of said contact element which projects into said inner space of said tire is pointed toward a running surface opposite to said inner surface of said tire.

16. A combination of a warning device and a pneumatic tire, according to claim 1, wherein said contact element is adjustable in a longitudinal direction of said contact element against an adjusting force towards an inside of said vehicle wheel.

17. A combination of a warning device and a pneuamtic tire, according to claim 3, wherein said adjustment member of said setup mechanism is arranged in a customary rotating rim of said vehicle wheel and said adjustment member is adjustable from a basic position relative to an adjoining area of said adjustment member to an area adjacent a rim area.

* * * * *